US010798948B2

(12) United States Patent
Bruns et al.

(10) Patent No.: US 10,798,948 B2
(45) Date of Patent: Oct. 13, 2020

(54) APPARATUS FOR AND METHOD OF PROCESSING A FOODSTUFF (71) Applicant: VEMAG Maschinenbau GmbH, Verden/Aller (DE)

(72) Inventors: Andreas Bruns, Schiffdorf (DE); Mirko Drescher, Kirchlinteln-Hohenaverbergen (DE); Kersten Nilsson, Verden/Aller (DE); Tobias Kiel, Verden/Aller (DE)

(73) Assignee: VEMAG MASCHINENBAU GMBH, Verden/Aller (DE)

( * ) Notice: Subject to any disclaimer, the term of this patent is extended or adjusted under 35 U.S.C. 154(b) by 0 days.

(21) Appl. No.: 15/404,690

(22) Filed: Jan. 12, 2017

(65) Prior Publication Data

US 2017/0118999 A1   May 4, 2017

Related U.S. Application Data (62) Division of application No. 13/624,782, filed on Sep. 21, 2012, now abandoned.

(30) Foreign Application Priority Data

Sep. 23, 2011   (DE) .................. 10 2011 083 356

(51) Int. Cl.
*A21C 1/06* (2006.01)
*B01F 7/00* (2006.01)
(Continued)

(52) U.S. Cl.
CPC .................. *A21C 1/06* (2013.01); *A21C 1/00* (2013.01); *A22C 5/00* (2013.01); *B01F 7/00708* (2013.01);
(Continued)

(58) Field of Classification Search
CPC .. B01F 7/00416; B01F 7/00708; B01F 7/042; B01F 7/048; B01F 2215/0011;
(Continued)

(56) References Cited

U.S. PATENT DOCUMENTS 2,948,922 A   8/1960   Meskat et al.
3,203,370 A   8/1965   Haug et al.
(Continued)

FOREIGN PATENT DOCUMENTS

CH   389531 A   3/1965
DE   949162 C   9/1956
(Continued)

OTHER PUBLICATIONS

European Patent Office, Search Report issued in European patent application No. 12185557.1 dated Dec. 19, 2012.
(Continued)

*Primary Examiner* — Marc C Howell
(74) *Attorney, Agent, or Firm* — Thompson Hine LLP (57) ABSTRACT An apparatus and method for processing a foodstuff comprises a closed conveyor path, a conveyor device, and a treatment chamber. The conveyor path includes an inlet and an outlet. The conveyor device is positioned within the closed conveyor path and configured to receive the foodstuff from the inlet. The conveyor device is further configured to convey the foodstuff along the closed conveyor path toward the outlet. The treatment chamber is positioned within the closed conveyor path downstream of the conveyor device for receiving the foodstuff from the conveyor device. The treatment chamber includes a rotatably driven first kneading shaft configured to collide the foodstuff within the treatment chamber.

10 Claims, 9 Drawing Sheets (51) Int. Cl.
*B01F 7/04* (2006.01)
*A21C 1/00* (2006.01)
*A22C 5/00* (2006.01)

(52) U.S. Cl.
CPC .............. *B01F 7/042* (2013.01); *B01F 7/048* (2013.01); *B01F 2215/0011* (2013.01); *B01F 2215/0014* (2013.01)

(58) Field of Classification Search
CPC ...... B01F 2215/0014; B01F 9/06; A21C 1/06; A22C 5/00; B29C 47/6025
USPC ............................ 366/88, 323, 76.3, 83, 302
See application file for complete search history.

(56) References Cited

U.S. PATENT DOCUMENTS

| | | | |
|---|---|---|---|
| 3,593,379 A | 7/1971 | Hendry | |
| 3,652,062 A * | 3/1972 | Baker | A21C 1/065 366/80 |
| 3,652,063 A * | 3/1972 | Lawson | B01F 7/048 366/142 |
| 3,738,617 A | 6/1973 | Madonia | |
| 4,440,797 A | 4/1984 | Berkes et al. | |
| 4,883,361 A * | 11/1989 | Valentino | A21C 1/06 366/97 |
| 5,415,884 A * | 5/1995 | Manser | A21C 1/006 366/169.1 |
| 5,460,448 A | 10/1995 | Woolsey | |
| 5,758,962 A * | 6/1998 | Ismar | A21C 1/06 366/300 |
| 5,792,500 A | 8/1998 | Housset et al. | |
| 6,443,055 B1 | 9/2002 | Hashimoto et al. | |
| 7,794,134 B1 | 9/2010 | Henry | |
| 2001/0007686 A1 | 7/2001 | Song et al. | |
| 2005/0255223 A1* | 11/2005 | Morin | A22C 5/00 426/646 |
| 2007/0194478 A1 | 8/2007 | Aoki et al. | |
| 2008/0094939 A1 | 4/2008 | Wenger et al. | |
| 2010/0062093 A1* | 3/2010 | Wenger | A23N 17/005 425/113 |
| 2010/0129520 A1* | 5/2010 | Cabrales | A22C 5/00 426/647 |

FOREIGN PATENT DOCUMENTS

| | | |
|---|---|---|
| DE | 1030787 B | 5/1958 |
| DE | 1156032 B | 10/1963 |
| DE | 3043327 A1 | 7/1981 |
| DE | 19512230 A1 | 12/1995 |
| DE | 69613726 | 7/2002 |
| DE | 10290838 | 4/2004 |
| FR | 1326446 A | 5/1963 |
| FR | 2833463 A1 | 6/2003 |
| WO | 9217068 A1 | 10/1992 |
| WO | 9222208 A1 | 12/1992 |
| WO | 2008101559 A1 | 8/2008 |

OTHER PUBLICATIONS

European Patent Office, Office Action issued in European patent application No. 12185557.1 dated Oct. 28, 2013.
German Patent and Trade Mark Office, Official Action issued in Application 10 2011 083 356.0 dated Dec. 20, 2016.

* cited by examiner

APPARATUS FOR AND METHOD OF PROCESSING A FOODSTUFF

TECHNICAL FIELD

The invention concerns an apparatus for and method of processing a foodstuff, in particular for processing dough.

BACKGROUND

Apparatuses are used for the automated production and processing of dough items and also in other regions in the foodstuffs industry where, for example, sausage meat is processed. In view of the high cost pressures, automated installations are wide-spread, especially on an industrial scale, in which the foodstuffs (also referred to as product) are processed in closed systems to give a finished product, starting from intermediate products or starting ingredients.

Known apparatuses for processing dough have a closed conveyor path, within which there is a conveyor device for receiving and conveying the foodstuff. The conveyor device used is not exclusively, but predominantly, volume conveyors. Foodstuffs, such as dough items, are circulated in the volume chambers of the volume conveyors during the conveying process and, in that way, are subjected to alternating shearing loads. Those shearing loads cause damage to the structure of the foodstuff to be processed, which results in a non-homogeneous foodstuff structural configuration. The non-homogeneities have the effect of fluctuating the quality of the foodstuff and, in part, creating an unsatisfactory product.

To counteract this disadvantage in known systems, the foodstuff delivered from the foodstuff outlet is post-treated manually or in a separate system to compensate for non-homogeneities which have occurred. That is time-consuming and costly.

Based on the foregoing considerations, the object of the invention is to provide an apparatus and a method which achieve an increase in product quality with a level of economy that remains the same as much as possible.

SUMMARY

The object of the invention is attained by an apparatus comprising a foodstuff inlet, a foodstuff outlet, a closed conveyor path extending between the inlet and the outlet, and a conveyor device. The conveyor device is adapted to receive the foodstuff fed by the foodstuff inlet and to convey the foodstuff in the conveyor path in the direction of the foodstuff outlet. In addition, a treatment chamber is arranged in the conveyor path downstream of the conveyor device for receiving and post-treating the foodstuff, preferably directly adjacent to the conveyor device, and within which a kneading means is rotationally drivably arranged. The kneading means is adapted to fold, stretch and collide the foodstuff in the treatment chamber.

In this respect, the term colliding is used to mean bringing or pressing together parts of the foodstuff, which have been previously displaced by means of folding and/or stretching with the same and/or other parts of the foodstuff. The invention is based on the realization that the homogeneity of the foodstuff following conveyance by means of a volume conveyor can be improved by the foodstuff being kneaded as gently and carefully as possible. In that respect, the mechanisms of folding, stretching and colliding provide that the foodstuff structure is homogenized and, for example, in the case of dough items, the dough development is advantageously promoted. In that respect, gluten network formation is promoted because of the folding, stretching and colliding effects. The advantage of this invention is that it provides a treatment chamber within the closed conveyor path. The foodstuff automatically passes through the treatment chamber following conveyance by the conveyor device in the direction of the foodstuff outlet of the apparatus. This permits the post-treatment operation to be implemented in a treatment chamber and in a space-saving configuration. Furthermore, the additional apparatus expenditure that would otherwise have been necessary on external treatment units with kneading means is avoided.

Preferably, the kneading means has a kneading shaft and one or more kneading elements arranged on the kneading shaft.

Further preferably, the kneading means has one or more holding elements, preferably in the form of a hook, a bar and/or stripper, which are arranged immovably in the treatment chamber. The holding means are adapted to prevent the entire foodstuff from also rotating with the kneading means.

In a further preferred embodiment, the kneading means has a second kneading shaft and one or more kneading elements arranged on the second kneading shaft.

Preferably, the second kneading shaft and the first kneading shaft are arranged parallel to each other and are drivable synchronously with each other. The first and second kneading shaft are drivable in such a way that the kneading elements of the first kneading shaft and the kneading elements of the second kneading shaft rotate in opposite of each other and in a mutually interengaging relationship.

Preferably, the kneading elements of the first and/or second kneading shaft are replaceable individually or in sets. Further preferably, there are various sets of kneading elements, which involve different geometries and thus different displacement characteristics. Having regard to the respective nature of the conveyed foodstuff that is to be post-treated, it is possible to use kneading elements which are especially adapted to the viscosity of the foodstuff.

In a further advantageous embodiment, the treatment chamber has a chamber inlet, a chamber outlet, and a central axis extending from the inlet to the outlet. The first kneading shaft and/or the second kneading shaft of the kneading means is oriented parallel to the central axis, so that the foodstuff is conveyed substantially in the direction of the central axis on the closed conveyor path of the apparatus from the chamber inlet to the chamber outlet in the treatment chamber. This has the advantage that the foodstuff is engaged by the kneading elements primarily transversely relative to the direction of the conveyor path. In that way, the shearing occurring in the foodstuff is less than when it is engaged by kneading elements, which would additionally cause the foodstuff to be accelerated in the direction of the central axis or in the opposite direction thereto.

In a preferred embodiment of the apparatus of the present invention, the conveyor device is a vane cell pump, a gear pump, or a rotary piston pump. Particularly preferably, the apparatus has a conveyor device which has a screw pump having a conveyor chamber, a conveyor chamber inlet, a conveyor chamber outlet, a first conveyor shaft, and a conveyor screw mounted thereon that extends between the inlet and the outlet.

Alternatively, a particularly preferred apparatus of the present invention has a conveyor device which has a double-spindle pump having a conveyor chamber, a conveyor chamber inlet, a conveyor chamber outlet, a first conveyor shaft, a second conveyor shaft, and a respective conveyor screw mounted on the first or second conveyor shaft that extends between the inlet and the outlet.

An advantageous development of the apparatus according to the invention provides that an outlet-side portion of the conveyor screw or the conveyor spindles is of a reduced pitch relative to an adjacent portion (which is further spaced from the outlet). The reduced pitch in the outlet-side portion of the conveyor screw or the conveyor spindles provides for compacting of the foodstuff. The chamber portions in that portion convey in each revolution a smaller volume than the portions arranged upstream thereof. That gives the particular advantage that the conveyor device acts at the same time as a portioning unit.

The term portioning is used herein to mean that the portioning unit is adapted to achieve complete filling of the conveyor path and a homogeneous mass flow with respect to the foodstuff being conveyed. A portioning unit in the present sense is not to be interpreted as a device for individually separating parts of the foodstuff being conveyed, but for producing 'synchronism' of the foodstuff. Synchronism is produced in such a way that in the devices following the portioning unit, in each interval being considered (for example, in each pump revolution or each unit of time), there is always exactly the same amount of foodstuff that passes in and out of the portioning unit.

A particularly advantageous development of the apparatus of the invention provides that the first kneading shaft of the kneading means is oriented coaxially with the first conveyor shaft of the conveyor device. The first kneading shaft is preferably connected to the first conveyor shaft in a force-transmitting relationship. In a simple and particularly advantageous configuration, the first kneading shaft is coaxially and rigidly connected to the first conveyor shaft so that a single drive simultaneously drives the conveyor shaft and the kneading shaft. That provides for minimizing the structural space and the drive means. In addition, that means that the treatment chamber can be moved as closely as possible to the conveyor chamber of the conveyor device.

In a preferred embodiment, the conveyor chamber and the treatment chamber are in the form of a continuous chamber.

Particularly preferably in the embodiments having a second kneading shaft (and with a conveyor device having two conveyor shafts), the second kneading shaft of the kneading means is also oriented coaxially with the second conveyor shaft of the conveyor device. Preferably, the second kneading shaft is also connected to the second conveyor shaft of the conveyor device in force-transmitting relationship. In regard to the second kneading shaft, the particularly preferred and simple configuration whereby the second kneading shaft is rigidly connected to the second conveyor shaft equally applies.

In alternative preferred embodiments, if neither of the above-described conveyor screws or spindles with a variable pitch are used, but other preferred conveyor devices are used, it has proven to be advantageous to include in the apparatus a portioning unit arranged in the conveyor path downstream of the conveyor device.

Further preferably, the portioning unit is arranged in the conveyor path upstream of the treatment chamber. That provides for homogenized filling of the treatment chamber and, thus, improves the constancy of the product quality delivered by the foodstuff outlet from the apparatus.

In a method of the kind set forth in the opening part of this specification, the object of the invention is also attained by the steps of introducing a foodstuff into a conveyor device by means of a foodstuff inlet, conveying the foodstuff in a closed conveyor path in the direction of a foodstuff outlet, receiving the foodstuff in a treatment chamber arranged in the conveyor path downstream of the conveyor device, and post-treating the foodstuff in the treatment chamber by means of rotationally driving a kneading means. The foodstuff is folded, stretched and collided by means of the kneading means. That gives the same advantages which have already been described in relation to the apparatus according to the invention. Accordingly, attention is directed to the foregoing description.

The method of the invention further preferably includes: preventing the entire foodstuff from also rotating with the kneading means by means of holding elements, preferably in the form of a hook, a bar and/or a stripper, in the treatment chamber.

Further preferably, the method of the invention includes synchronously driving a first kneading shaft and a second kneading shaft of the kneading means in such a way that kneading elements of the first kneading shaft and kneading elements of the second kneading shaft rotate in opposite relationship and in a mutually interengaging relationship.

Further preferably, the method includes the step of portioning the conveyed foodstuff by means of the conveyor device, which has an outlet-side portion of a conveyor screw or two conveyor spindles with a pitch reduced relative to an adjacent portion. The foodstuff may also be portioned by means of a portioning unit downstream of the conveyor device in the conveyor path.

Further preferably, portioning in accordance with the method of the invention is effected upstream of the treatment chamber in the conveyor path.

BRIEF DESCRIPTION OF THE DRAWINGS

The invention is described in greater detail hereinafter by means of preferred embodiments and with reference to the accompanying Figures. In the drawing.

DETAILED DESCRIPTION

The diagrammatic view shown in FIG. 1 of an apparatus according to the invention for processing a foodstuff, in particular for processing dough, also represents in its structure, in principle, the apparatuses of the individual embodiments described hereinafter. The apparatus 1 has a foodstuff inlet 3 opening into a conveyor device 7. The apparatus 1 further has a foodstuff outlet 5 adapted to deliver the processed foodstuff out of the apparatus 1. A conveyor path extends between the foodstuff inlet 3 and the foodstuff outlet 5. Part of the conveyor path is the conveyor device 7. Arranged within the conveyor device 7 are conveyor means 18, which convey the foodstuff from the foodstuff inlet 3 in the direction of the foodstuff outlet 5 within the conveyor path which is of a closed configuration. Arranged after the conveyor device 7 (downstream thereof) is a treatment chamber 21. The treatment chamber 21 is optionally continuous with the conveyor device 7 or is in the form of a separate chamber. Disposed within the treatment chamber 21 is a kneading means 22, which is rotationally drivable and is adapted to fold, stretch and collide the foodstuff in the treatment chamber 21.

In accordance with various preferred embodiments of the invention, the conveyor means 18 are optionally of differing configurations, which are also described hereinafter with reference to the various embodiments by way of example.

Figure 1:
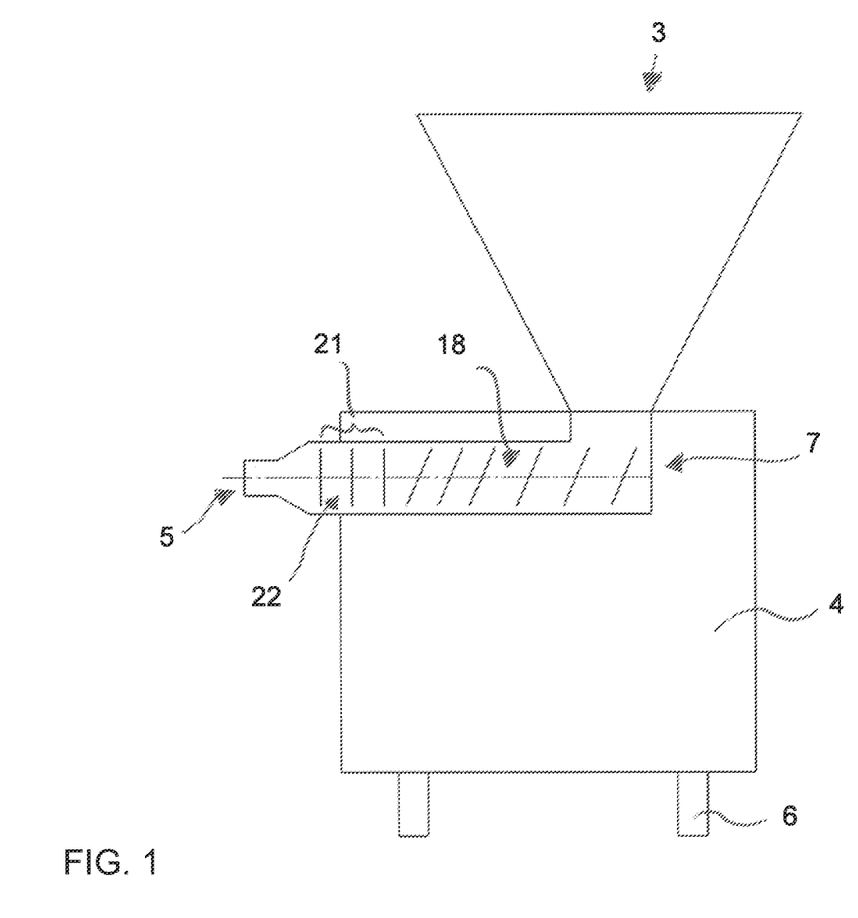
FIG. 1 is a diagrammatic view, applicable generally to all embodiments, of an apparatus according to the invention.

The apparatus 1 in FIG. 1 has a main body 4 having a housing equipped with feet points 6 for erection at the location of operation.

Figure 2:
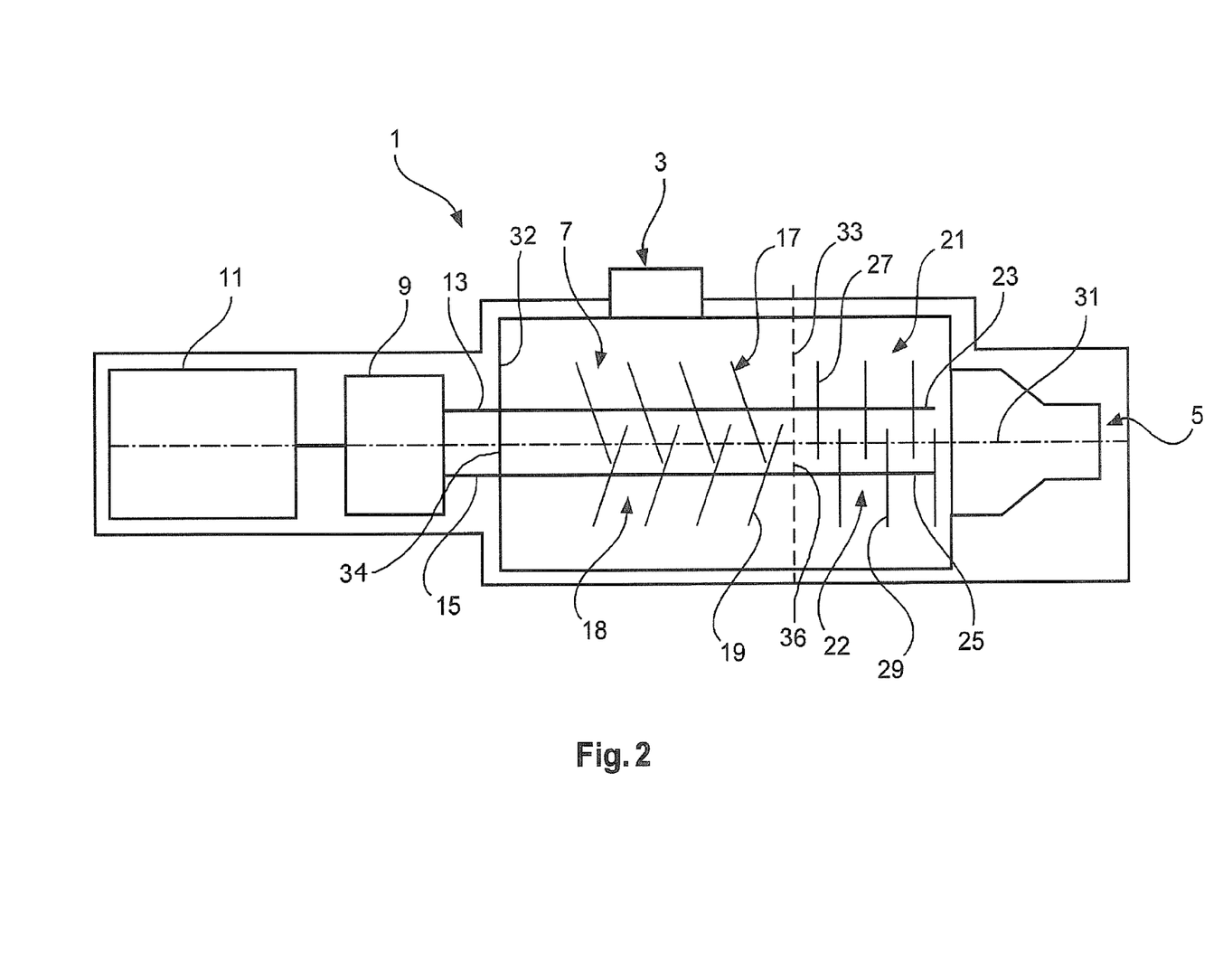
FIG. 2 is a diagrammatic view of an apparatus in a first embodiment.

The embodiment shown in FIG. 2 and the other embodiments shown in FIGS. 3 through 6 have structural similarities. Therefore identical elements are denoted by the same references.

The conveyor device 7 of the apparatus 1, diagrammatically shown in FIG. 2, is drivable by a transmission 9 and a motor 11. The transmission 9 is adapted to synchronously drive a first conveyor shaft 13 and a second conveyor shaft 15 in mutually opposite relationship. A first conveyor spindle 17 is arranged on the first conveyor shaft 13 within the conveyor device 7 while a second conveyor spindle 19 is arranged on the second conveyor shaft 15.

The kneading means 22 is rotationally drivably arranged in the treatment chamber 21. The kneading means 22, in FIG. 2, has a first kneading shaft 23 and a second kneading shaft 25. A plurality of first kneading elements 27 are arranged on the first kneading shaft 23. A plurality of second kneading elements 29 are arranged on the second kneading shaft 25. The first kneading shaft 23 and the second kneading shaft 25 are arranged parallel to a central axis 31. The first kneading shaft 23 in the FIG. 2 embodiment is arranged coaxially with the first conveyor shaft 13. The second kneading shaft 25 is arranged coaxially with the second conveyor shaft 15. The respective kneading shafts 23, 25 are preferably connected to the respectively coaxially arranged conveyor shafts 13, 15 in a force-transmitting relationship and, particularly preferably, rigidly connected. The treatment chamber 21 is preferably in the form of a separate chamber separated from a conveyor chamber 32 of the conveyor device 7 by means of a chamber wall 33. The conveyor chamber 32 also includes a conveyor chamber inlet 34 and a conveyor chamber outlet 36. In an alternative configuration, the conveyor device 7 and the kneading means 22 disposed in the treatment chamber 21 are arranged jointly in a chamber. In such a case, the separating wall 33 is omitted, as indicated by the broken line.

In operation of the apparatus 1, the foodstuff is introduced into the conveyor device 7 by means of the foodstuff inlet 3 for processing the foodstuff. The introduced foodstuff is conveyed in the closed conveyor path by the conveyor device 7 in the direction of the foodstuff outlet 5. On its way along the closed conveyor path in the direction of the foodstuff outlet 5, the foodstuff is received in the treatment chamber 21 arranged downstream of the conveyor device 7. In the treatment chamber 21, the foodstuff is folded, stretched and collided by means of rotational driving of the kneading means 22, such as the first kneading shaft 23 and the second kneading shaft 25, thus providing for homogenization of the foodstuff. The homogenized foodstuff is then conveyed in the direction of the foodstuff outlet 5 and finally out of the foodstuff outlet 5 and discharged.

In that case, the first kneading shaft 23 and the second kneading shaft 25 are driven in such a way that the kneading elements 27 of the first kneading shaft 23 and the second kneading elements 29 of the second kneading shaft 25 rotate in opposite and mutually interengaging relationship.

Figure 6:
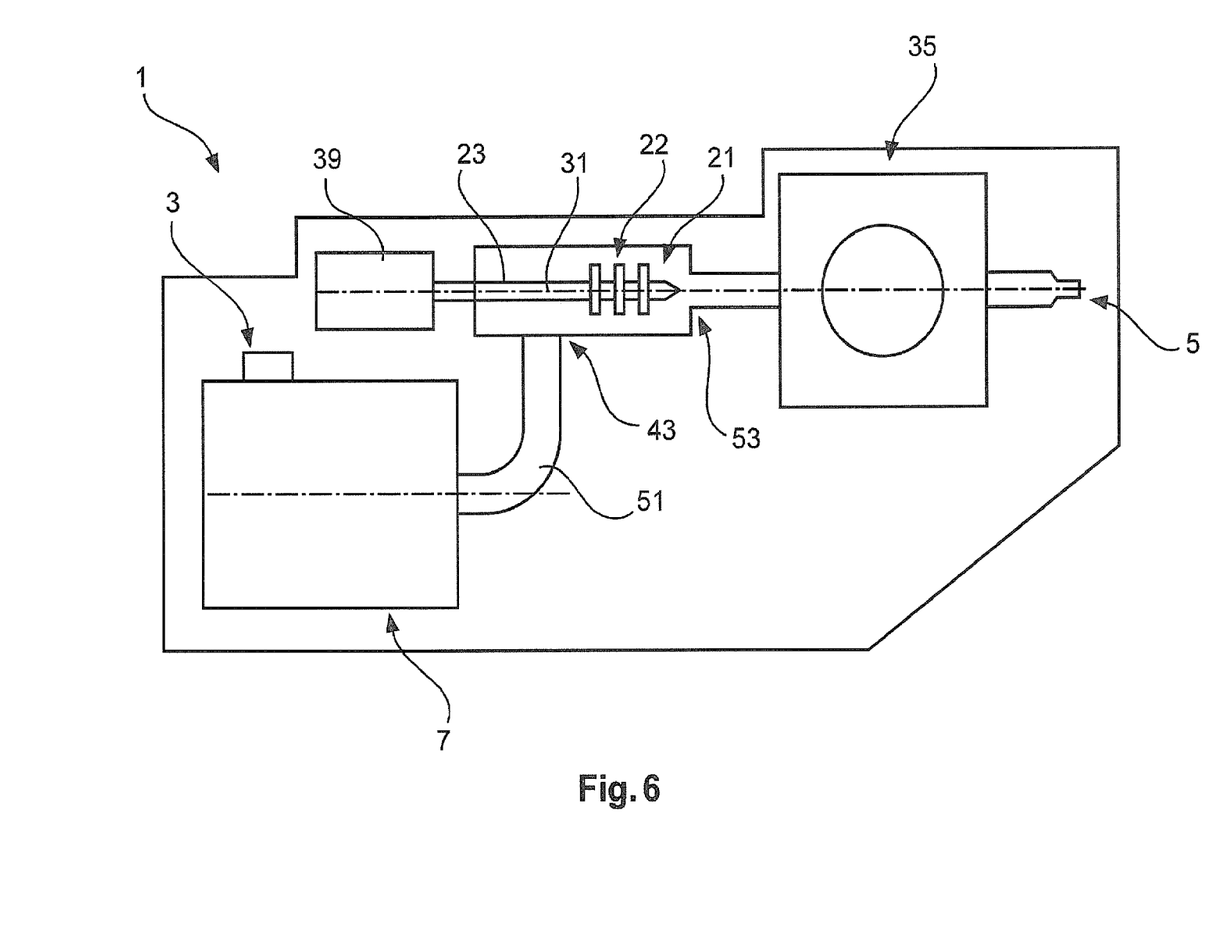
FIG. 6 is a diagrammatic view of an apparatus in a fifth embodiment.
Figure 7:
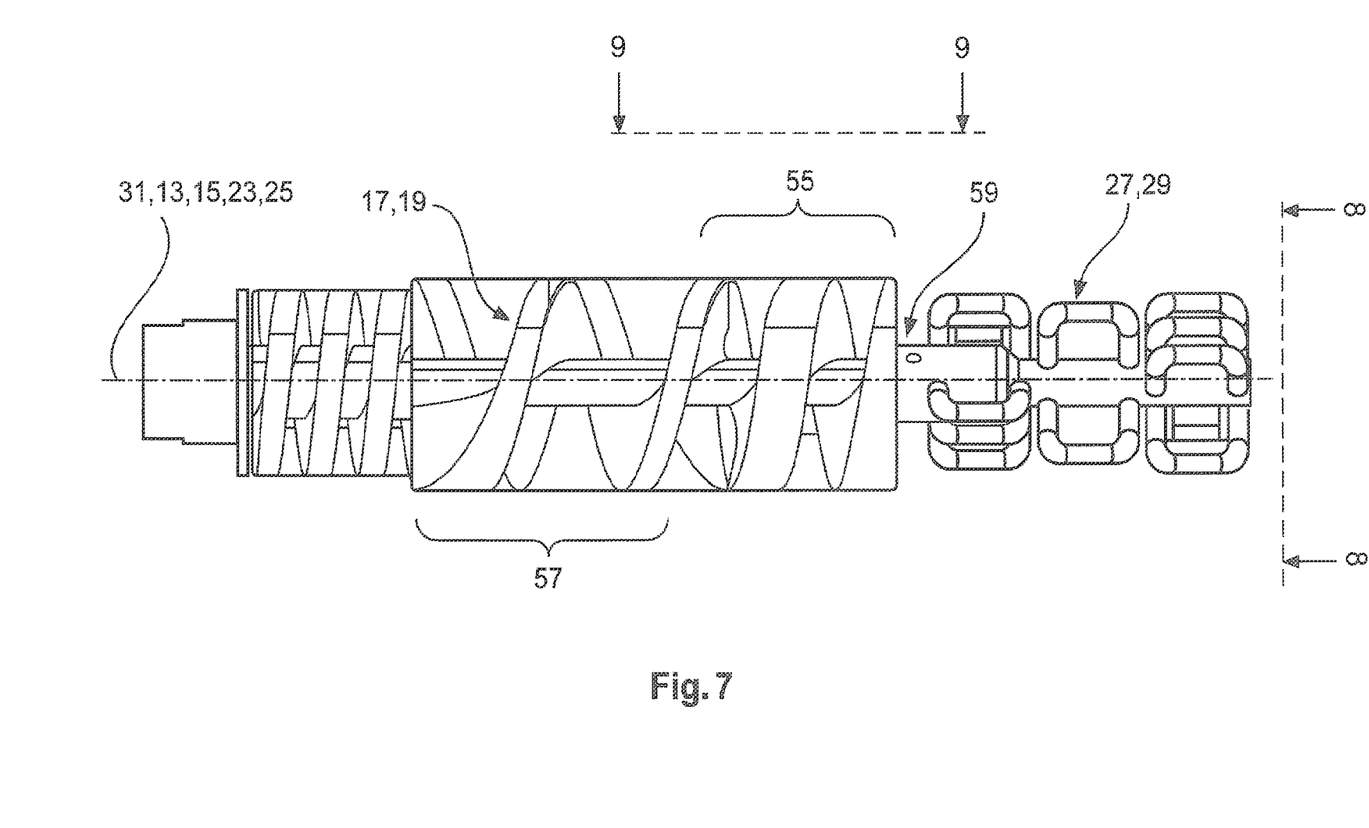
FIG. 7 is a side view of a part of the apparatus in the first or second embodiment.
Figure 8:
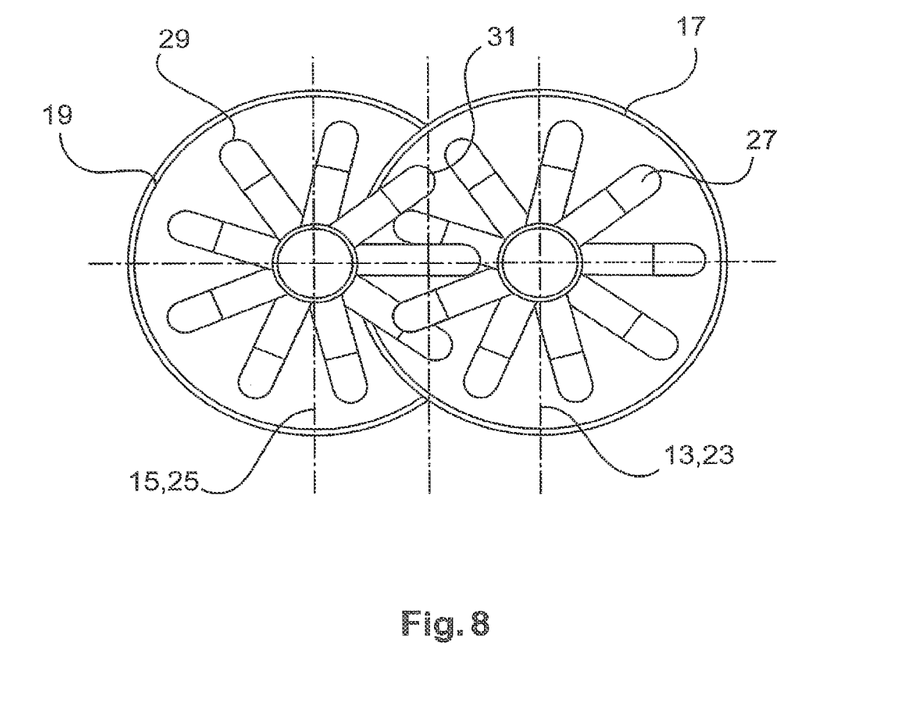
FIG. 8 is a projection of the side view of FIG. 7.

The conveyor device 7, diagrammatically shown in FIG. 2, is preferably of a configuration in accordance with the embodiment shown in FIGS. 6 through 8.

Figure 3:
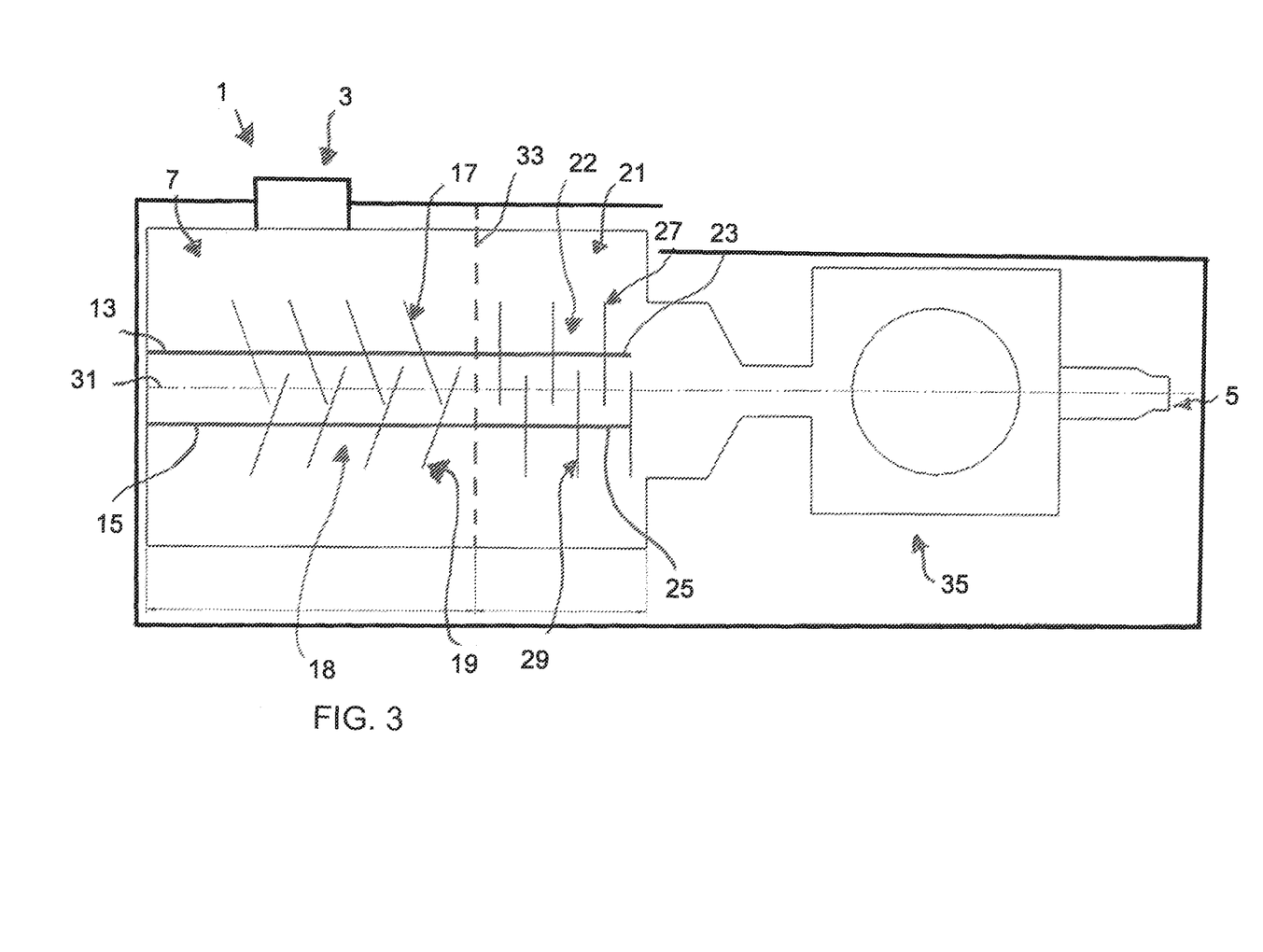
FIG. 3 is a diagrammatic view of an apparatus in a second embodiment.

The apparatus 1, diagrammatically shown in FIG. 3, in which the illustration of the transmission and the motor has been omitted, differs from the structure shown in FIG. 2 in that a portioning unit 35 is arranged downstream of the treatment chamber 21. The foodstuff homogenized in the treatment chamber 21 is introduced into the portioning unit 35 and discharged therefrom in the direction of the foodstuff outlet 5.

The FIG. 3 embodiment is particularly advantageous for installations in which a conveyor device 7 with conveyor means is in the form of a double-spindle pump, the double-spindle pump having a constant spindle pitch.

Figure 4:
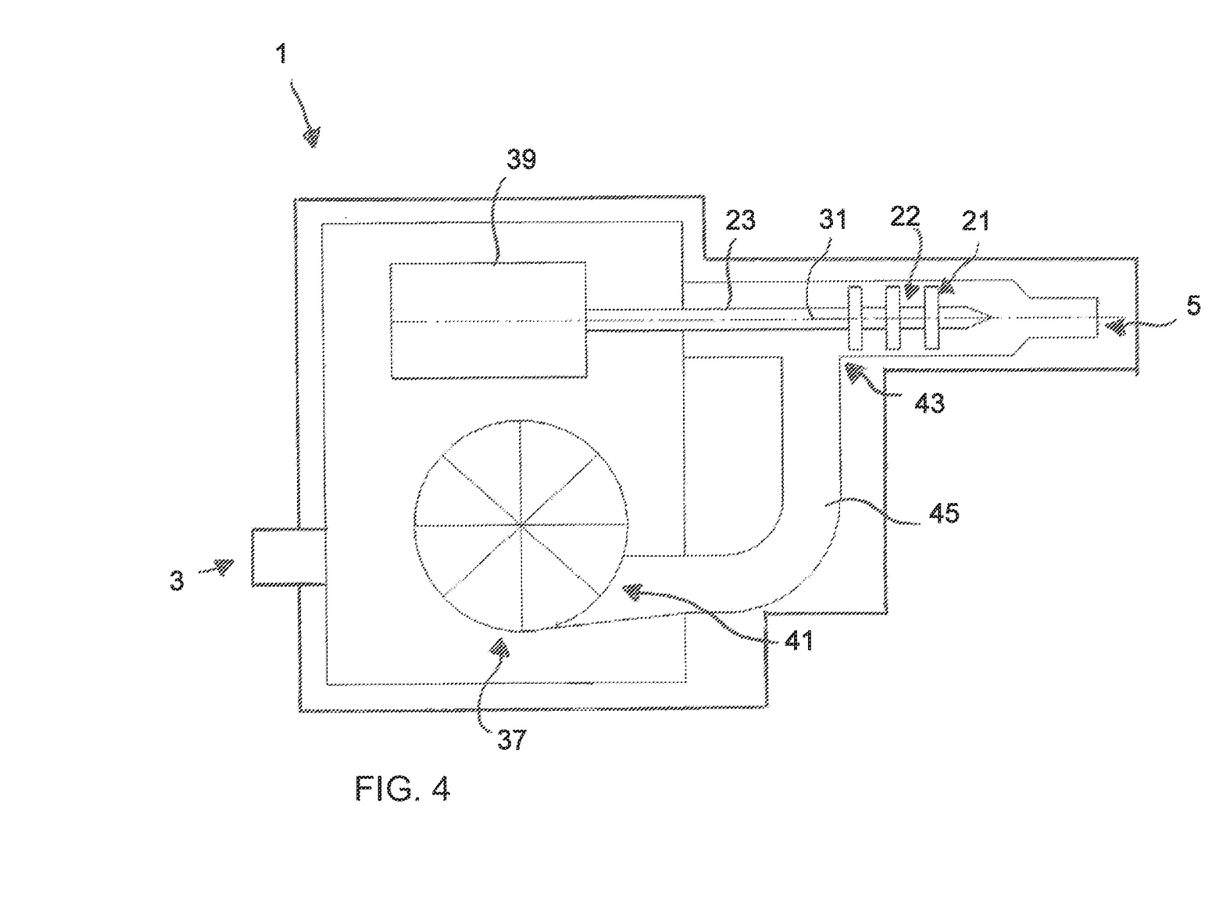
FIG. 4 is a diagrammatic view of an apparatus in a third embodiment.

The embodiment of the apparatus shown in FIG. 4 differs from the embodiments of FIGS. 2 and 3 in that the treatment chamber 21 is arranged downstream of the conveyor device 7, but not arranged immediately adjoining it. As shown in FIG. 4, a unit with conveyor means in the form of a vane cell pump 37 is provided as the conveyor device 7. Optionally, in addition to the vane cell pump 37, a screw pump (not shown), or another volume conveyor, can be connected upstream, which is adapted to completely fill the chamber elements of the vane cell pump and successively the entire closed conveyor path.

The vane cell pump 37 has an outlet 41 connected by means of a line 45 to an inlet 43 of the treatment chamber 21. The kneading means 22 with a kneading shaft 23 is arranged in the treatment chamber 21. The kneading shaft 23 is coaxial with the central axis 31. The kneading means 22 in FIG. 4 is driven by a dedicated second drive 39. The second drive 39 and the first drive (not shown) of the vane cell pump 37 are optionally synchronously drivable by means of an electronic control circuit.

Figure 5:
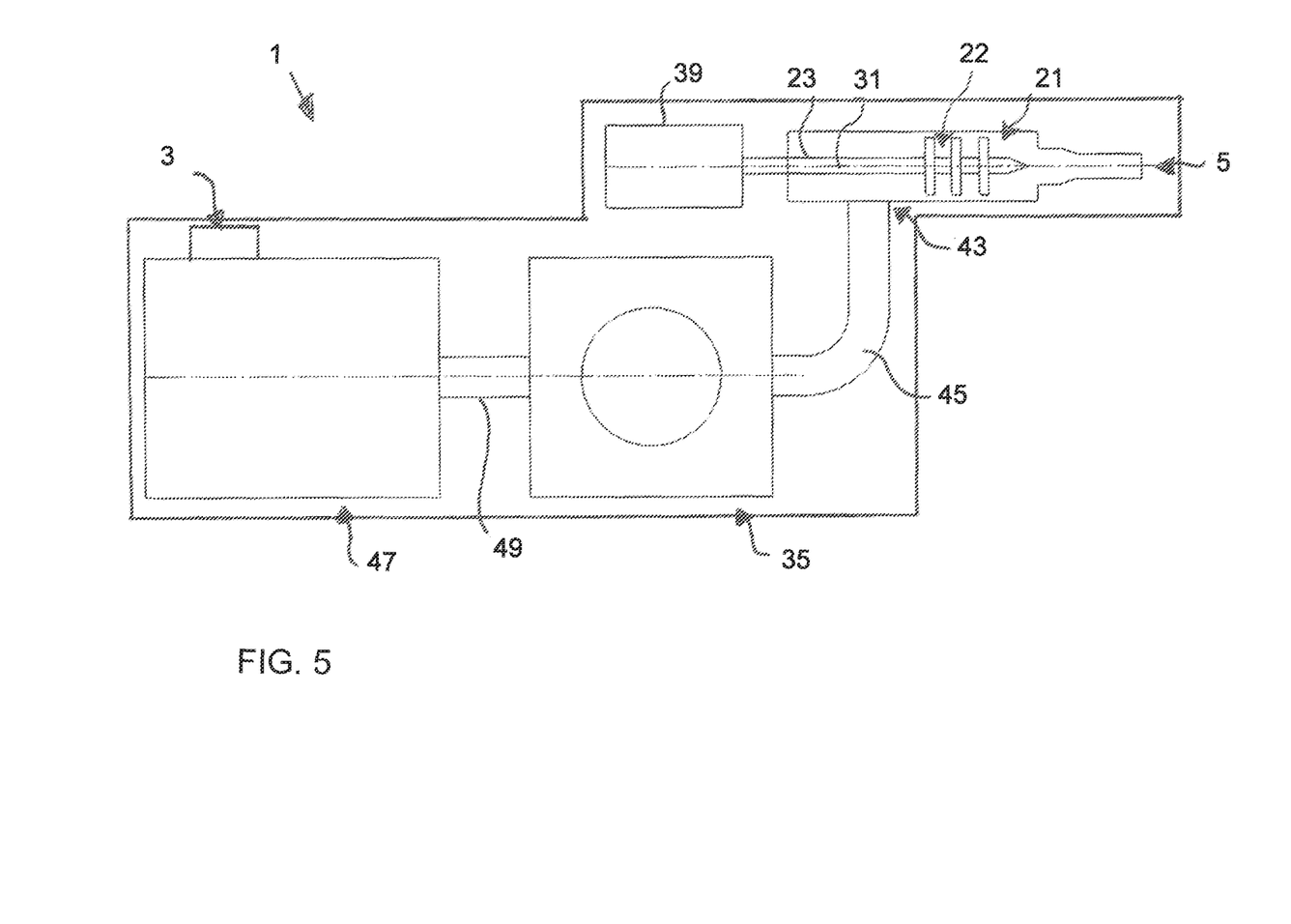
FIG. 5 is a diagrammatic view of an apparatus in a fourth embodiment.

FIG. 5 shows an embodiment which is in more general terms in comparison with FIG. 4. The apparatus 1 of FIG. 5 has a conveyor device 7 in the form of a volume conveyor, a gear pump, a vane cell pump or a rotary piston pump. The conveyor device 7 is connected to the portioning unit 35 by means of a line 49.

The FIG. 6 embodiment differs from the FIG. 5 embodiment in that the portioning unit 35 is not arranged upstream of the treatment chamber 31 but both downstream of the conveyor device 7 and also the treatment chamber 21. The conveyor device 7 is connected to the treatment chamber 21 by means of a line 51 and the treatment chamber 21 is connected to the portioning unit 35 by means of a line 53.

Figure 9:
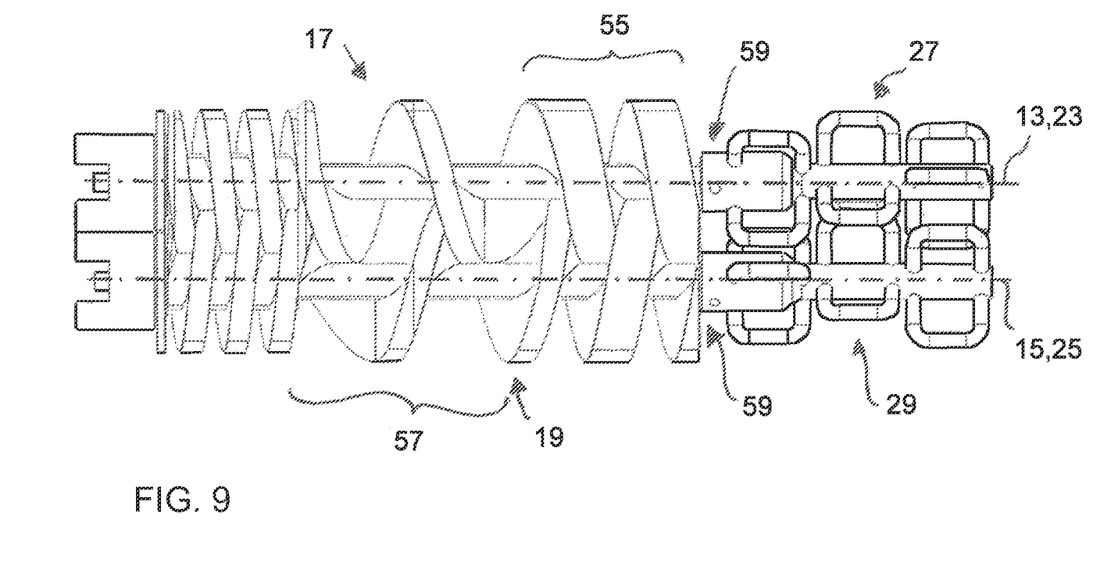
FIG. 9 is a projection of the side views of FIGS. 7 and 8.

A part of the apparatus 1 of the invention, in accordance with the embodiments of FIGS. 2 and 3, is shown in a number of side views in FIGS. 7 through 9. FIGS. 7 through 9 show the first conveyor shaft 13 and the second conveyor shaft 15 arranged parallel to each other and to the central axis 31. First and a second conveyor spindles 17, 19 are respectively arranged on the first and second conveyor shafts 13, 15. The conveyor spindles 17, 19, in the direction of the conveyor path (in the normal installation condition of the apparatus 1), have an outlet-side portion 55. The spindle pitch is reduced in the outlet-side portion 55 relative to an adjacent portion 57 of the conveyor spindles 17, 19. A set of the first kneading elements 27 is connected on its kneading shaft 23 in a torque-fixed relationship to the first conveyor shaft 13 and arranged coaxially with the first conveyor spindle 17. The first kneading shaft 23 is driven jointly with the first conveyor shaft 13. The second kneading elements 29 are arranged on a second kneading shaft 25 connected in a torque-fixed relationship to the second conveyor shaft 15. The second kneading shaft 15 is arranged coaxially to the second conveyor shaft 15 and is driven jointly therewith. A coupling, is indicated by reference 59, in FIG. 6 is the connecting location between a kneading shaft 23, 25 and the first or second conveyor shaft 13, 15 respectively associated therewith.

FIGS. 8 and 9 show the interengaging arrangement of the first kneading elements 27 and the second kneading elements 29. The axes of the conveyor shaft 13 and the kneading shaft 23, on the one hand, and the conveyor shaft 15 and the kneading shaft 25, on the other hand, are preferably at an equal spacing relative to the central axis 31.

What is claimed is:

1. A method comprising:
    introducing dough in an unprocessed condition into a closed conveyor path through a foodstuff inlet;
    conveying the dough with a conveyor device along the closed conveyor path toward a foodstuff outlet;
    receiving the dough in a processing chamber arranged in the closed conveyor path downstream of the conveyor device;
    processing the dough in the processing chamber as a homogenous mass within a constant mass flow, including synchronously driving a first kneading shaft and a second kneading shaft to rotate within the processing chamber in opposite directions relative to each other such that a first plurality of kneading elements on the first kneading shaft and a second plurality of kneading elements on the second kneading shaft interengage during rotation in the opposite directions for stretching, folding, and colliding the dough; and
    receiving the dough in a portioning unit arranged in the closed conveyor path downstream of the conveyor device.

2. The method of claim 1 further comprising:
    preventing the entirety of the dough from rotating with the first kneading shaft via at least one holding element within the processing chamber.

3. The method of claim 1 further comprising:
    portioning the conveyed dough with the conveyor device; and
    compacting the dough with an outlet-side portion of the conveyor device with reduced pitch relative to an adjacent portion of the conveyor device.

4. The method of claim 1 further comprising:
    portioning the conveyed dough downstream of the conveyor device within the closed conveyor path.

5. The method of claim 1 further comprising:
    portioning the conveyed dough upstream of the processing chamber within the closed conveyor path.

6. The method of claim 1 wherein stretching, folding, and colliding the dough promotes gluten network formation in the dough.

7. The method of claim 1 wherein the dough is engaged by the first plurality of kneading elements and the second plurality of kneading elements primarily transversely to a direction of the closed conveyor path.

8. The method of claim 1 further comprising:
    discharging the processed dough from the foodstuff outlet, wherein the processed dough discharged from the foodstuff outlet is not post-treated to compensate for non-homogeneities introduced into the dough by the conveyor device.

9. The method of claim 4 wherein the unprocessed dough is received in the processing chamber after portioning.

10. The method of claim 1 wherein the portioning unit is configured to achieve filling of the closed conveyor path and the constant mass flow of the dough being conveyed.

* * * * *